April 13, 1954     J. H. THOMAS     2,674,913
BAIL FOR SECURING COUPLING PINS
Filed Sept. 15, 1950
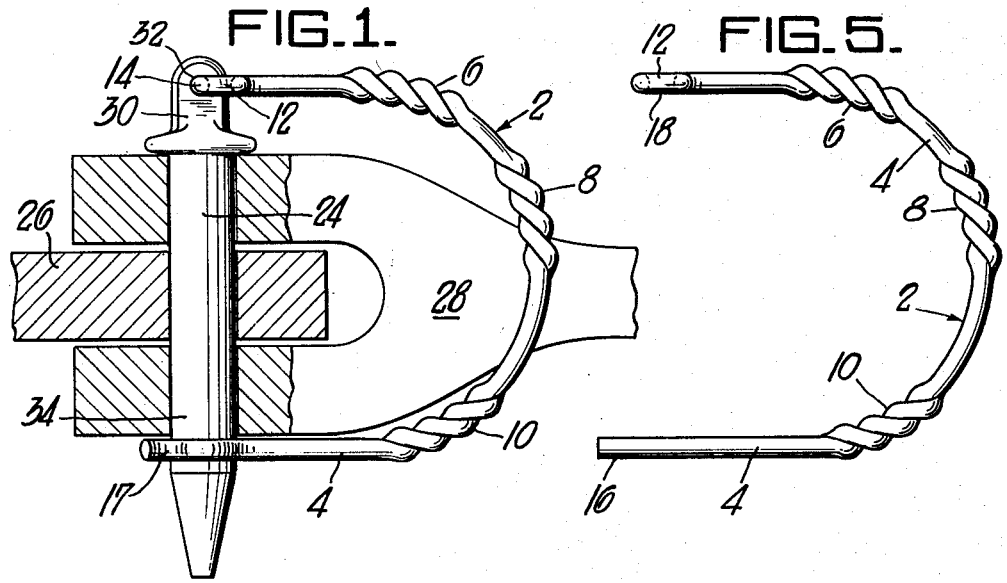
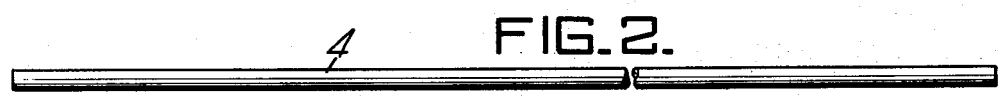
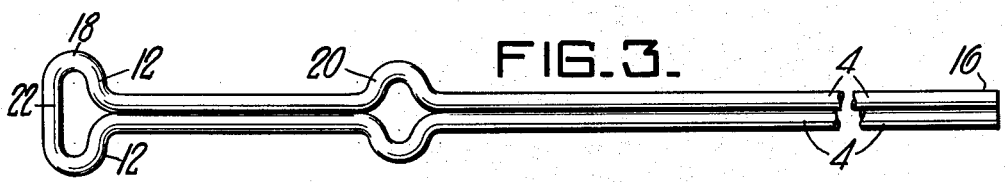
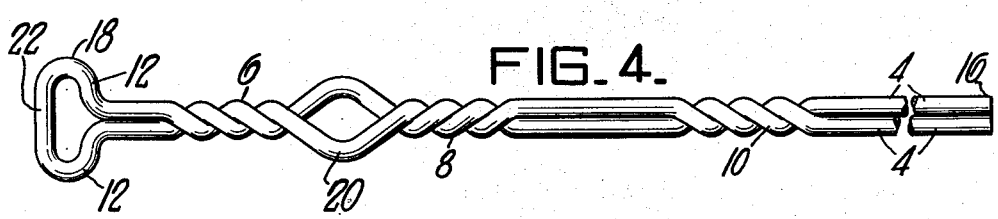
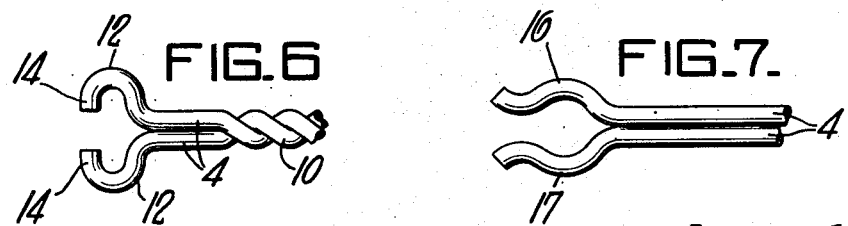
*Inventor:*
JOHN H. THOMAS,
by: Donald G. Dalton
his Attorney.

Patented Apr. 13, 1954

2,674,913

UNITED STATES PATENT OFFICE 2,674,913

BAIL FOR SECURING COUPLING PINS

John H. Thomas, North Chicago, Ill., assignor to United States Steel Corporation, a corporation of New Jersey Application September 15, 1950, Serial No. 185,060

1 Claim. (Cl. 85—8.8)

The present invention relates to bails and more particularly to a wire bail especially suitable for securing coupling or clevis pins and the like.

A clevis pin is frequently used to hitch an earth-working implement to a farm tractor. The tractor hitch is a simple yoke member or clevis for accommodating the implement hitch which is ordinarily a straight bar member. There are holes in each of the two members which align, when the implement hitch is positioned in the tractor clevis, for receiving the clevis or coupling pin. The bail of my invention may be used in conjunction with the clevis pin for the purpose of locking the pin in position so as to prevent it from becoming lost or accidentally jarred out of the tractor clevis.

It is, accordingly, an object of my invention to provide a bail for clevis pins and the like.

This and other objects will be more apparent after referring to the following specification and attached drawings, in which:

Figure 1 is a side elevational view showing the bail of the invention attached to a clevis pin;

Figures 2, 3, 4 and 5 show the processing steps used in manufacturing the bail;

Figure 6 is a plan view showing the pivoted end of the bail; and

Figure 7 is a plan view showing the clip end of the bail.

Referring more particularly to the drawings, reference numeral 2 indicates generally the bail of my invention. The bail, in its finished form, consists of two wires 4 in side-by-side relationship twisted around each other at spaced intervals as at 6, 8 and 10 and bent into a U-shape. One end 12 of the twisted wires is shaped to form opposed spaced pivots 14. The opposite end 16 of the wires 4 is curved and spaced apart to form spring clip 17. The portions of the wires between turns 10 and the clip 17 are left untwisted so as to provide resiliency to the spring clip.

In manufacturing the bail, a length of hard-drawn steel wire is first straightened and cut and then bent over on itself to form a hairpin shape with an arbor 18 at the head thereof. The two leg wires 4 are crimped at a point spaced from the arbor 18 to form an eye 20 for receiving a twisting bar (not shown). Then the arbor 18 is clamped tightly in a suitable holding vise and a bar is inserted into the eye 20 and turned to twist the wires around each other at least two turns adjacent each side of the eye 20. The bar is then removed from the eye and the free ends of the leg wires 4 are manipulated to twist the wires around each other at least two turns approximately midway between the ends 16 of the wires and the eye 20. Next, the twisted wires are bent into a U-shape as shown in Figure 5. The ends 16 are now curved to form the spring clip 17, and the pivots 14 are formed at the opposite end of the wires by cutting out a portion 22 of the circumference of the arbor 18. The bail is now finished and ready for use. It may be remarked here that after the hairpin shape has been formed and the leg wires have been twisted around each other, the subsequent steps in manufacturing the bail may be done in any order convenient and not necessarily in the order or sequence described above.

Figure 1 shows the bail in use with a clevis pin 24 used to hold an implement hitch 26 connected to a tractor clevis 28. The pivots 14 of bail 2 are spaced apart a distance which is slightly less than the thickness of the head portion 30 of the pin 24. This arrangement makes it possible for the pivots 14 to be spread apart slightly and sprung into hole 32 in the head portion 30 and be held therein by the spring action of the twisted wires 4. The opposite ends 16 of the wires 4 are curved apart a distance which is somewhat less than the diameter of the lower portion 34 of the pin so that when the clip 17 of the bail is snapped into locking position on the pin the bail will not be jarred loose therefrom.

While one embodiment of my invention has been shown and described, it will be apparent that other adaptations and modifications may be made without departing from the scope of the following claim.

I claim:

A bail for securing a coupling pin having a head and a cylindrical shank which comprises a pair of hard steel wires in side-by-side relationship twisted around each other for a plurality of turns at spaced intervals along their length, the direction of twist in each of said intervals being reversed from the direction of twist in the next adjacent interval, said twisted wires being bent into a U-shape yoke having substantially parallel legs, one end of said yoke being formed into opposed spaced pivots, a portion of said wires adjacent said pivots being straight and in side-by-side relation, the extremities of the wires of the opposite end of said yoke being bent to form spaced opposed outwardly curved cam surfaces, the wires adjacent said cam surfaces being bent to form opposed substantially coplanar outwardly convex portions generally similar to the contour of the cylindrical shank of the coupling pin, the wires adjacent the inward ends of said convex portions being straight and in side-by-side relationship, said cam surfaces and said convex portions forming a spring clip for receiving the cylindrical shank of the pin.

References Cited in the file of this patent

UNITED STATES PATENTS

| Number | Name | Date |
|---|---|---|
| 41,524 | Meily | Feb. 9, 1864 |
| 63,086 | Peebels | Mar. 19, 1867 |
| 326,499 | Gross | Sept. 15, 1885 |
| 783,808 | Vogel | Feb. 28, 1905 |
| 834,842 | Nutting | Oct. 30, 1906 |
| 904,846 | Costello | Nov. 24, 1908 |
| 1,505,258 | Hagen | Aug. 19, 1924 |
| 1,799,934 | Strid | Apr. 7, 1931 |
| 1,881,981 | Trussell | Oct. 11, 1932 |
| 2,454,856 | Bible | Nov. 30, 1948 |
| 2,514,594 | Weiler | July 11, 1950 |